July 12, 1955 W. BOYD 2,712,740
FLEXIBLE COUPLING
Filed Aug. 4, 1949 3 Sheets-Sheet 1

INVENTOR
WINNETT BOYD
By
ATTORNEY.

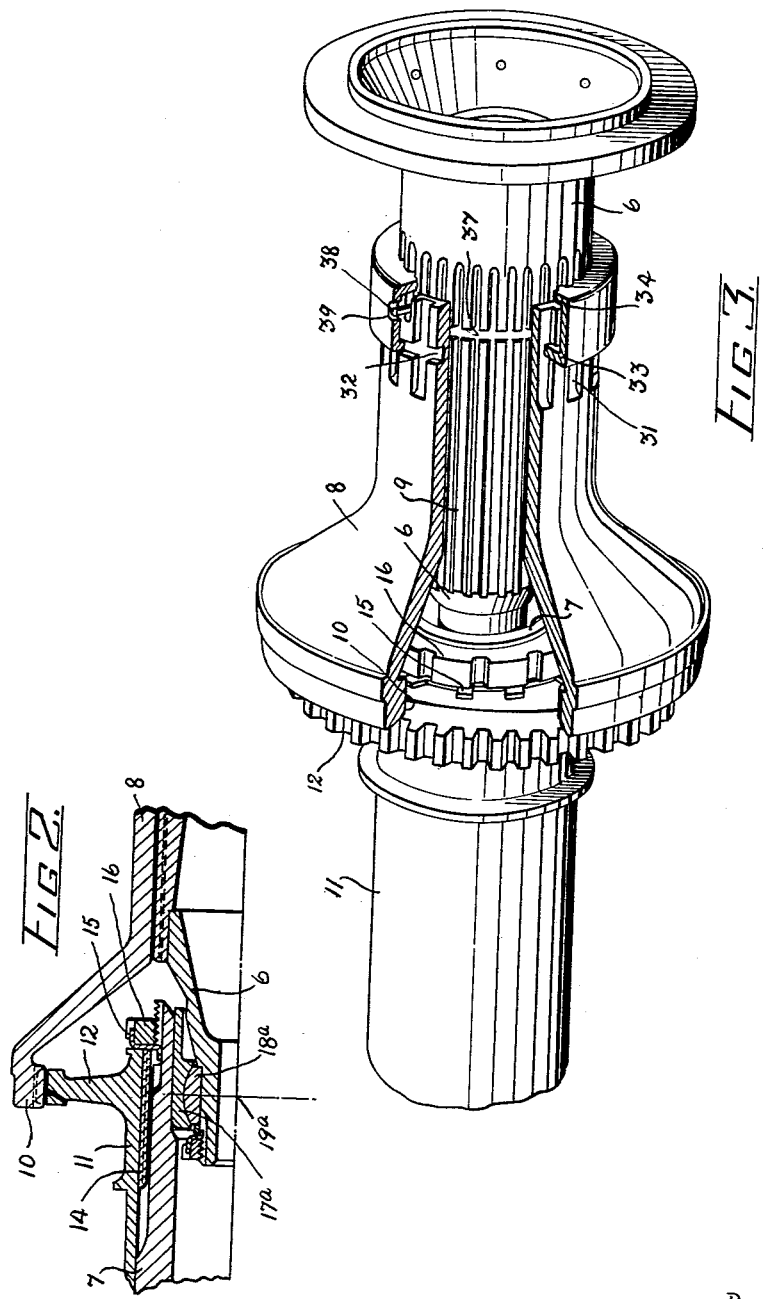

United States Patent Office 2,712,740
Patented July 12, 1955

2,712,740
FLEXIBLE COUPLING

Winnett Boyd, Bobcaygeon, Ontario, Canada, assignor to A. V. Roe Canada Limited, Malton, Ontario, Canada, a corporation Application August 4, 1949, Serial No. 108,509

13 Claims. (Cl. 64—9)

This invention relates to improvements in shaft couplings of the kind which are required in machines in which two coaxial shaft ends have to be interconnected torsionally. Such shafts are found for example in gas turbine engines, in which the shaft of a compressor developing thrust in one direction is required to be coupled coaxially to the shaft of a turbine subject to an opposite thrust. Although the coupling is described herein as applied to a gas turbine engine, it is not intended that its application be so limited.

In gas turbine engines and in other machines embodying rotatable shafts, the length of the shaft and the transverse loading thereon are such that it is necessary to support the shaft in three or more bearings. Even though the bearings may be aligned with great accuracy during construction, a certain amount of distortion is bound to occur in operation due to temperature changes, centrifugal and gyroscopic forces, stresses in the mounting means, and other causes. In such circumstances, unless the shaft is very flexible, it is always good practice to construct it in a number of coaxial sections, as intimated above, with not more than two bearings to each section, the sections being flexibly coupled together to allow for slight misalignment of the bearings. The flexible couplings must of course be capable of transmitting torque from one section of the shaft to the next, and in some instances it must also be capable of transmitting axial loads from one section of the shaft to the next. While the transmission of torque between angularly misaligned shafts presents no serious difficulties, the transmission of tension and compression loads through such shafts is not easy to achieve.

The primary object of this invention therefore is to provide a shaft coupling which is capable of transmitting torque and tension loads between the driving and driven portions or sections of a shaft running at small angles of misalignment, in a manner which is capable of simple stress analysis eliminating empirical factors.

Another object of the invention is to provide a coupling which is relatively easy to manufacture and which can be readily dismantled for inspection and maintenance, although under normal conditions it is capable of long periods of operation without attention.

All of the foregoing and still further objects and advantages of the invention will become apparent from a study of the following specification, taken in conjunction with the accompanying drawings, wherein like characters of reference designate corresponding parts throughout the several views and wherein:

Fig. 2 is a fragmentary longitudinal sectional view of a modified embodiment of a ball and collar joint which is proposed as an alternative to the somewhat similar ball and collar joint shown in Fig. 1.

Fig. 3 is another broken away perspective view of the coupling, illustrating the first step in dismantling it, namely by disconnecting the torsional drive portion of the coupling after unlocking the locking ring.

Figure 1:
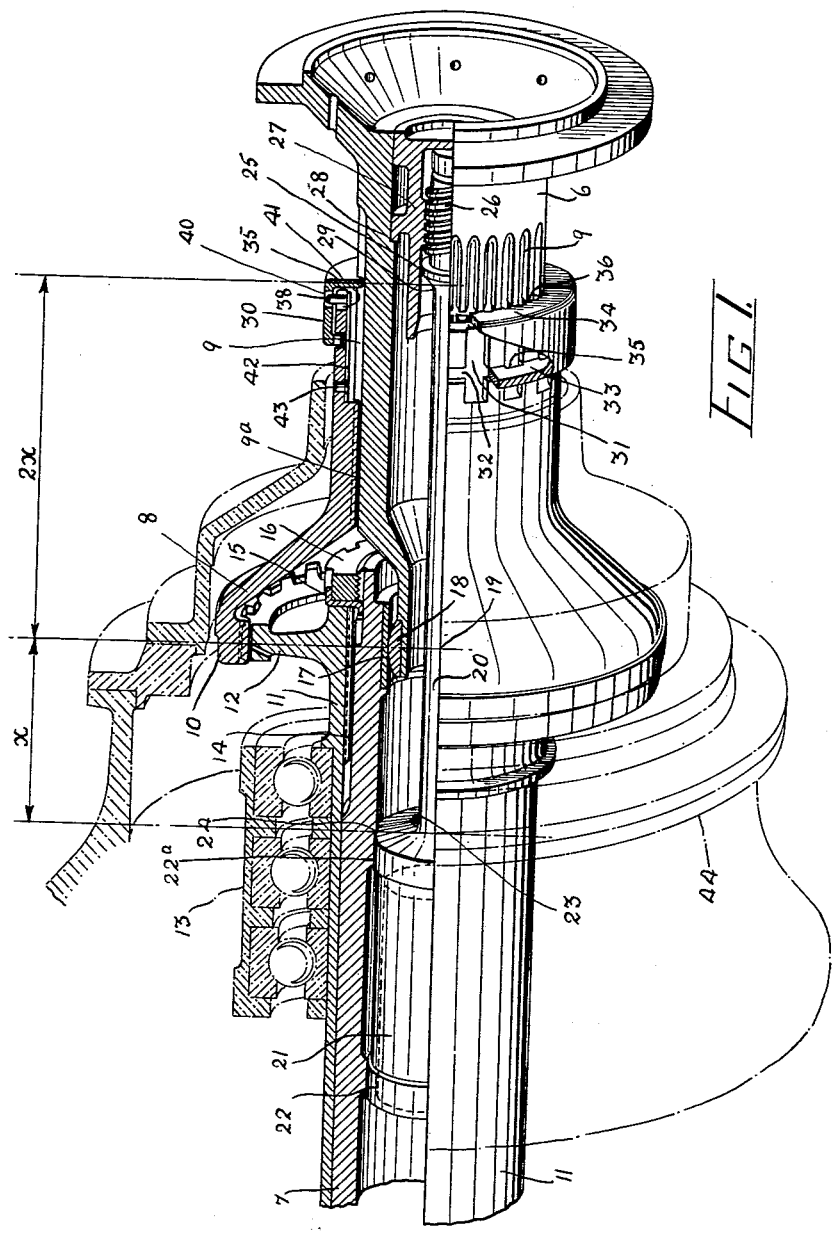
Fig. 1 is a broken away perspective view of a coupling constructed in accordance with this invention.

Referring to the drawings, which illustrate particularly a coupling constructed in accordance with this invention and for use in a gas turbine engine, the driving portion 6 of the power shaft is suitably connected to the turbine rotor shaft (not shown), whereas the driven portion 7 is connected to the compressor rotor (not shown); it will be noted that both the driving portion 6 and the driven portion 7 are hollow. The torque transmitting means interconnecting the shafts comprise interengaging members fast to the shafts as follows. Telescopically mounted over the driving shaft 6 is a bell shaped sleeve 8 and it engages with the shaft 6 by means of mating splines 9 and 9a. The sleeve 8 is thus slidable longitudinally with respect to the shaft 6 (but other means are provided to restrain this longitudinal sliding action), although the mating splines prevent rotation of these two parts with respect to each other. Adjacent the mouth of the bell shaped sleeve 8 and in its internal periphery is provided a ring gear 10, the involute teeth in the said ring gear being of straight side plan form.

Telescopically mounted on the driven shaft 7 is a sleeve 11 at the outer end of which is integrally formed a toothed disc 12. It is customary to install flexible couplings in close proximity to one of the bearings, and in the embodiment of the invention illustrated a bearing 13 is indicated in dotted line, the sleeve 11 being journalled in the said bearing. The sleeve 11 and the driven shaft 7 are coupled to each other by the mating splines 14. A lockwasher 15 and a nut 16 screwed at the end of the driven shaft are provided so as to prevent axial movement of the sleeve with respect to the driven shaft.

The involute teeth on the periphery of the disc 12 are of elliptoid plan form, and they register with the teeth in the ring gear 10 thereby transmitting torque from the sleeve 8 to the disc 12. Since the teeth in the ring gear 10 have parallel faces and the teeth of the disc 12 have elliptoid faces, there will always be substantially radial contact therebetween so long as the misalignment between the two shafts is small. It should of course be understood that flexible couplings of this type are only intended to be used in applications where the angular misalignment is small, and where there is no parallel misalignment. Moreover a coupling of this kind is not intended to be a universal joint, and it is only intended to eliminate any undesirable effects of small manufacturing inaccuracies and distortions of the mechanism in operation. In such circumstances the loading on the teeth of the ring gear 10 and of the disc 12 will be substantially uniform over the range of misalignment for which the coupling is intended.

The adjacent ends of the shafts 6 and 7 are located radially with respect to each other that is, constrained together, by means of an internal collar 17 which is provided at the end of the shaft 7, and a ball or spherical segment 18 which is provided at the end of the shaft 6, and cooperates with the collar. It will be noted that the collar serves only to locate the ball radially, and that it exerts no axial restraint on the ball. It will be appreciated that by reason of the constraining means described, should misalignment of the shafts occur, their axes will intersect at a given point which is located in the plane where the ball segment contacts the collar.

In Fig. 2 is shown an alternative to the preferred embodiment of ball and collar joint illustrated in Fig. 1. According to this construction, a ball 18a is mounted at the end of the shaft 6, and the said ball is positioned in a spherical segment collar or socket member 17a which socket member is internally mounted in the driven shaft 7 and is axially slidable therein. The essential and common feature of the ball and straight collar joint shown in Fig. 1 and of the ball and socket joint shown in Fig. 2 is that in both constructions the shafts 6 and 7 are free to pivot relative to each other about the centre of the ball (the centre being shown as 19 in the case of ball 18, and as 19a in the case of the ball 18a) and these centres are also free to move along the axis of the shaft 7.

Since there is no axial restraint exerted by the aforedescribed ball and collar joint or ball and socket joint, the two shafts 6 and 7 must be held in fixed axial relationship by means of a tension member. The tension member comprises a cylindrical rod 20 having an enlarged cylindrical portion 21 at one end, which is a shrink fit at 22 and 22a in the bore of the shaft 7. The diameter of the rod 20 is materially less than the internal bore of either of the shafts 6 or 7. At the root 23 of the rod, that is at the location where it blends with its enlarged portion 21, the rod is rigidly held with respect to the shaft 7, and is therefore capable of withstanding a considerable amount of tension and of compression. Furthermore, when the rod is in tension, the anchorage is definitely established by the shoulder 24 against which the front end of the cylindrical portion 21 is located and abuts.

At the other end of the rod 20 is a circular flange 25 and screw threads 26. The rod 20 is located radially and longitudinally in the shaft 6 by a threaded sleeve 27 which is a shrink fit in the bore of shaft 6 and bears upon a shoulder 28 provided therein. The tension member is located axially by its threads 26 which engage with the threaded sleeve 27. These threads are dimensioned to restrain axial movement that is, longitudinal displacement of the rod along the axis of the shaft, but to exert no radial restraint, the tension member being located radially by the circular flange 25 which bears upon an unthreaded portion of the bore of the sleeve 27. The circular flange 25 is relatively narrow, so that the lateral restraint of the tension member in the sleeve amounts to almost pure shear with no bending moment; the periphery of the flange 25 can be considered as the circle of radial constraint of the rod at that end.

It is important to note that by virtue of its rigid mounting in the shaft 7 and the shear loading effect through the circular flange 25, the rod 20 will behave substantially as a cantilever beam encastered at one end with a concentrated load at the other end. It is a property of such beams that tangents to the flexure curve at either end always intersect at a point one-third of the distance from the encastered end to the loaded end. An essential feature of the invention disclosed and claimed herein is that the tension member is so located longitudinally in the shafts 6 and 7 that when the said shafts are perfectly coaxial with each other, a hypothetical plane passing through the points of engagement of the teeth of the ring gear 10 with the teeth of the disc 12 will intersect the tension member at a point located substantially one-third of the distance from the fillet at the root 23 of the rod 20 to the fillet 29 at the base of the circular flange 25. The hypothetical plane passing through the point of engagement of the teeth of the ring gear 10 and the teeth of the disc 12 obviously includes the point of intersection of the shafts when they are not perfectly coaxial with each other. The relationship between the location of the tension member and of the aforementioned plane or point of intersection of the shafts is graphically illustrated in Fig. 1 by the dimensions $x$ and $2x$. In other words, the rod is located such that the distance between its encastered end and said given point of intersection of the shafts is substantially one-third of its length, the length referring to the portion of the rod operative as a flexible member, namely the portion measured between the aforementioned fillets. Thus the axes of the shafts 7 and 6 will always be tangential to the slope of the beam, that is to the slope of the rod 20 at its encastered end (root 23) and at its loaded end (fillet 29) respectively; in other words, the flexible tension rod 20 is subjected to simple bending only, when there is misalignment between the shafts 7 and 6. Therefore, the tension member is capable of simple stress analysis, and consequently a tension member of minimum size and weight relative to the strength required can be designed without empirical factors. Incidentally, it should be mentioned that in theory the ball and collar device and the ball and socket device are not essential features of the invention and they could be dispensed with, although in practice they have advantageous features. Obviously the ball and collar or the ball and socket device must also be located at the point on the rod through which passes the aforedescribed hypothetical plane.

In operation, torque is transmitted from the driving shaft 6, through the splines 9 and 9a to the sleeve 8 and its ring gear 10, to the toothed disc 12 and sleeve 11, and finally to the driven shaft 7 through the splines 14. The ring gear 10 and the toothed disc 12 are held together axially by the tension member 20. Any misalignment between the shafts 6 and 7 will result in a corresponding misalignment between the teeth of the ring gear 10 and of the disc 12. In view of the fact that the teeth of the disc 12 are of elliptoid section, they are able to roll on the mating ring gear teeth under slight angular displacement and, provided such displacement is in fact slight, the load distribution across the teeth will not be materially affected. When the shafts 6 and 7 are misaligned, there will always be two diametrically opposite teeth in each of the ring gear 10 and the disc 12 which are centrally and fully engaged under the restraining influence of the tension member.

Under conditions of misalignment, the rod portion 20 of the tension member will assume the normal curve of an encastered beam loaded at its end, and this curve will fair smoothly into the axes of the shafts 6 and 7 so that any longitudinal loading on the rod 20 will be applied axially at its extremities. As the rod rotates with the shaft, it will flex freely to maintain this ideal curvature. There will be no lateral restraint exercised by the threads 20 and, therefore, no unknown factors in the stressing of the rod 20 and no tendency to fret or wear in the thread itself under operating conditions.

So as to prevent the sleeve 8 from sliding axially with respect to the disc 12 thereby causing the mating teeth to disengage, there is provided a locking ring 30 which will be hereinafter described. The end of the sleeve 8 remote from the ring gear 10 carries external or male splines 31 of substantially greater pitch than the internal splines 9a on the said sleeve; and spaced from the end of the sleeve is a circumferential groove 32. The locking ring 30 has two inwardly-facing flanges 33 and 34; the flange 33 carries internal or female splines 35 to mate with the splines 31 aforementioned, while the flange 34 carries internal or female splines 36 to mate with the splines 9 on the shaft 6. Thus, during initial assembly, the flange 33 may be slid over the end of the sleeve 8 until the flange is superimposed upon the groove 32, in which position the locking ring is free to rotate on the sleeve 8.

The splines 9a and 31 on the sleeve 8 and the splines 35 and 36 on the flanges of the locking ring are so arranged that it is necessary to rotate the locking ring around the sleeve to align the splines 9a on the sleeve and the splines 36 on the flange 34, and this movement of the splines 35 along the groove 32 destroys their registration with the splines 31. In the first angular position thus obtained the splines 9a and 34 are aligned, enabling the sleeve 8, complete with the locking ring 30, to be slid over the splines 9 of the shaft 6.

A circumferential groove 37 is provided in the shaft 6, in such a position that, when the flange 33 of the locking ring is engaged with the groove 32 of the sleeve and the other flange 34 of the locking ring is superimposed upon the said groove 37, the centre 19 of the ball 18 lies in the aforementioned hypothetical plane of the ring gear 10. Thus the sleeve will be correctly situated on the shaft when the flange 34 is engaged with this groove 37, which may be accomplished by a further rotation of the locking ring into a second angular position, wherein the splines 36 after moving circumferentially along the groove 37 are out of registration, by one-half pitch, with the splines 9 on the shaft. This second rotary movement of one-half pitch of the splines on the shaft is insufficient to restore registration of the splines 35 with the splines 31 on the sleeve 8, the said splines 35 remaining engaged with the groove 32. It will be understood therefore that in the second angular position which has been described the sleeve 8 will be correctly and positively located axially with respect to the shaft 6 by virtue of the splines 35 and 36 in the locking ring 30 being engaged with the circumferential grooves 32 and 37 respectively and being out of registration respectively with the splines 31 on the sleeve and with the splines 9 on the shaft.

In the sleeve 8 is provided a spring pressed locking pin 38 which is adapted to engage with either one of two radial apertures 39 or 40 provided in the locking ring 30 to prevent rotation thereof; more particularly the locking pin comprises a pin passing through an aperture 41 in the sleeve and being secured at one end of the leaf spring 42, the other end of which is riveted by rivet 43 to the sleeve. When the locking pin 38 is in aperture 39 the locking ring 30 is in the first angular position hereinbefore described and the splines 36 are aligned with the splines 9a and in registration with the splines 9: when the pin is in aperture 40 the locking ring is in the second angular position and the splines 36 are out of alignment with the splines 9a by one half pitch. The ring 30 may also be rotated to a third position wherein the locking pin does not register with either aperture 39 or 40 and wherein the splines 35 provided in the flange 33 register with the splines 31 provided in the sleeve 8, thereby enabling the ring to be withdrawn from the sleeve.

To dismantle the coupling from the assembled condition shown in Fig. 1 the spring pressed locking pin 38 is pushed inwardly with a suitable pointed instrument; the locking pin being thus disengaged from the aperture 40 in the ring 30, the ring may be rotated to the position shown in Fig. 3 when the pin will engage aperture 39. With the ring thus rotated the sleeve 8 may be slid axially on the shaft 6 to disengage the ring gear 10 from the toothed disc 12, as shown in Fig. 3. Thus the torque transmitting element of the coupling is rendered inoperative and it is then a simple matter to withdraw the shaft 6 from engagement with the shaft 7 by turning the said shaft 6 in such a way as to unscrew sleeve 27 from the tension member 20. The ball joint serves to centre the shafts with respect to each other, thereby facilitating this operation.

Figure 4:
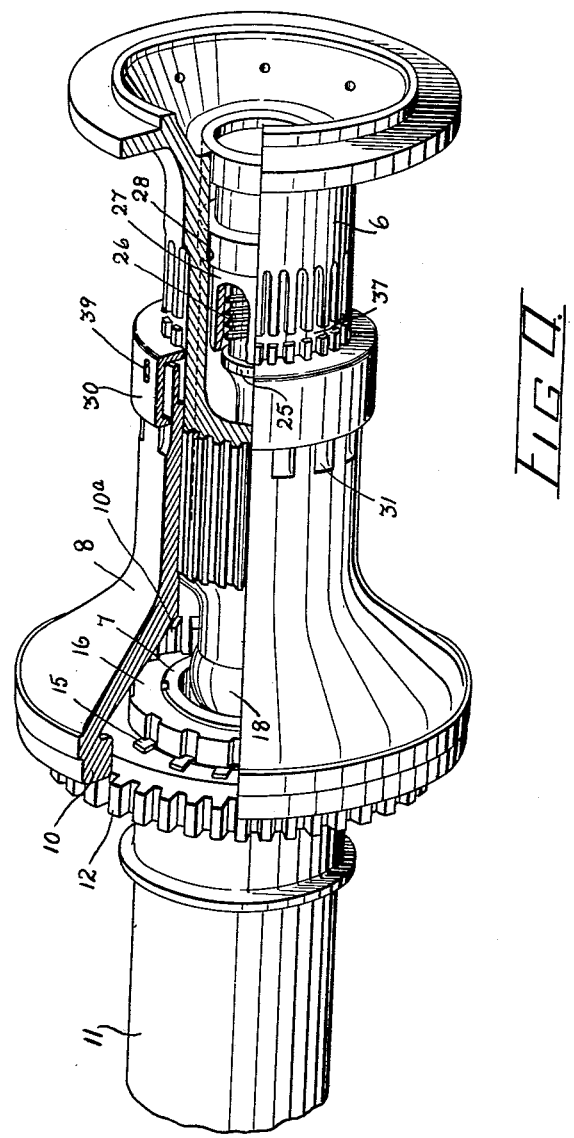
Fig. 4 is also a broken away perspective view of the coupling showing how the tension member is dismantled after the torsional drive has been disconnected.

The latter operation is shown in Fig. 4, and it will be seen that as the sleeve 27 is unscrewed from the tension member 20, the sleeve 8 may be slid down the splines 9 if there be some obstruction which prevents the ready withdrawal of the sleeve 8 integrally with the shaft 6. As an example of a possible obstruction, a casing 44 of the machine is shown in chain-dotted lines in the drawings. Of course if there is no such obstruction, the coupling can be dismantled without removing the sleeve 8 entirely from the shaft 6.

Reassembly is effected by a reversal of the above described steps.

It is to be understood that the form of the invention herewith shown and described is to be taken as a preferred example of the same, and that various changes in the shape, size and arrangement of the parts may be resorted to without departing from the spirit of the invention or the scope of the subjoined claims.

What I claim as my invention is:

1. A flexible coupling for coaxial shaft ends comprising, torque transmitting means and axial load transmitting means, the said torque transmitting means including radius members mounted on one end of each shaft and means on the radius members interengaging them in torque transmitting relationship, the said axial load transmitting means including a flexible rod mounted axially within the two shafts, the said rod having a root end and another end and being encastered at its root end in one of said shafts, means at the said other end of the rod constraining it against radial movement and against axial movement in the other shaft, the rod being located axially relative to the shafts, when they are truly aligned, in such a position that a hypothetical plane passing through the points of interengagement of the radius members will intersect the rod at a point substantially one-third of the distance from its root to its other end.

2. A flexible coupling for coaxial shaft ends comprising, torque transmitting means and axial load transmitting means, the said torque transmitting means including an internally toothed sleeve keyed to one shaft and a toothed disc keyed to the other shaft and engaging with the toothed sleeve, the said axial load transmitting means including a flexible rod mounted within the two shafts, the said rod having a root end and another end and being encastered at its root end in one of said shafts, means at the said other end of the rod constraining it against radial movement and against axial movement, the rod being located axially relative to the shafts, when they are truly aligned, in such a position that a hypothetical plane passing through the points of engagement of the toothed disc with the toothed sleeve will intersect the rod at a point substantially one-third of the distance from its root to its other end.

3. A flexible coupling for coaxial shaft ends comprising, torque transmitting means, means locating the shafts radially, and axial load transmitting means, the said torque transmitting means including an internally toothed sleeve keyed to one shaft and a toothed disc keyed to the other shaft and engaging with the toothed sleeve, the said locating means including a spherical segment provided at the end of one shaft and a sleeve provided at the end of the other shaft, the spherical segment being rotatably mounted in the sleeve and being axially slidable with respect to the shaft in which the sleeve is provided, the said axial load transmitting means including a flexible rod mounted within the two shafts, the said rod having a root end and another end and being encastered at its root end in one of said shafts, means at the said other end of the rod constraining it against radial movement and against axial movement, the rod being located axially relative to the shafts, when they are truly aligned, in such a position that a hypothetical plane passing through the points of engagement of the toothed disc with the toothed sleeve will intersect the rod at a point substantially one-third of the distance from its root to its other end.

4. A flexible coupling for substantially coaxial shafts subject to slight misalignment wherein the axes of the shafts intersect at a given point, comprising hollow end portions on said shafts, torque transmitting means interconnecting said shafts, and axial load transmitting means including a rod axially encastered at one end within one of said hollow portions and axially located at its other end within the other of said hollow portions, and means restraining said other end of said rod against longitudinal and radial displacement relative to said other hollow portion, said rod being located such that the distance between its encastered end and said given point is substantially one-third of its length.

5. A flexible coupling for substantially coaxial shafts subject to slight misalignment wherein the axes of the shafts intersect at a given point, comprising hollow end portions on said shafts, torque transmitting means interconnecting said shafts including an internally toothed portion fast to one shaft engaging an externally toothed portion fast to the other shaft, and axial load transmitting means including a rod axially encastered at one end within one of said hollow portions and axially located at its other end within the other of said hollow portions, and means restraining said other end of said rod against longitudinal and radial displacement relative to said other hollow portion, said rod being located such that the distance between its encastered end and said given point is substantially one-third of its length.

6. A flexible coupling for substantially coaxial shafts subject to slight misalignment, comprising means radially constraining the ends of said shafts together in order to cause their axes to intersect at a given point upon the occurrence of misalignment, hollow end portions on said shafts, torque transmitting means interconnecting said shafts, and axial load transmitting means including a rod axially encastered at one end within one of said hollow portions and axially located at the other end within the other of said hollow portions, and means restraining said other end of said rod against longitudinal and radial displacement relative to said other hollow portion, said rod being located such that the distance between its encastered end and said given point is substantially one-third of its length.

7. A flexible coupling for substantially coaxial shafts subject to slight misalignment, comprising means radially constraining the ends of said shafts to intersect at a given point upon the occurrence of misalignment and including a collar portion on the end of one shaft and a ball segment on the end of the other shaft and fitting within said collar portion, hollow end portions on said shafts, and torque transmitting means interconnecting said shafts, and axial load transmitting means including a rod axially encastered at one end within one of said hollow portions and axially located at the other end within the other of said hollow portions, and means restraining said other end of said rod against longitudinal and radial displacement relative to said other hollow portion, said rod being located such that the distance between its encastered end and said given point is substantially one-third of its length.

8. A flexible coupling for substantially coaxial shafts subject to slight misalignment wherein the axes of the shafts intersect at a given point, comprising hollow end portions on said shafts, torque transmitting means interconnecting said shafts, and axial load transmitting means including a rod axially encastered at one end within one of said hollow portions and axially located at its other end within the other of said hollow portions, and means restraining said other end of said rod against longitudinal and radial displacement relative to said other hollow portion comprising a narrow circular flange at said other end of said rod and a cooperating part within said other hollow end portion engaging said flange to provide radial restraint, and a threaded end piece on said rod and a cooperating threaded part within said other hollow end portion engaging said threaded piece to provide longitudinal restraint, said rod being located such that the distance between its encastered end and said given point is substantially one-third of its length.

9. A flexible coupling for substantially coaxial shafts subject to slight misalignment, comprising means radially constraining the ends of said shafts to intersect at a given point upon the occurrence of misalignment and including a collar portion on the end of one shaft and a ball segment on the end of the other shaft and fitting within said collar portion, hollow end portions on said shafts, torque transmitting means interconnecting said shafts including an internally toothed portion fast to one shaft engaging an externally toothed portion fast to the other shaft, and axial load transmitting means including a rod axially encastered at one end within one of said hollow portions and axially located at the other end within the other of said hollow portions, and means restraining said other end of said rod against longitudinal and radial displacement relative to said other hollow portion, said rod being located such that the distance between its encastered end and said given point is substantially one-third of its length.

10. A coupling as in claim 4 and wherein the means restraining said other end of said rod comprise a narrow circular flange at the end of said rod and a co-operating part within said other hollow end portion engaging said flange to provide radial restraint, and a threaded end piece on said rod and a co-operating threaded part within said other hollow end portion engaging said threaded piece to provide longitudinal restraint, the threads on said threaded piece and threaded part being proportioned to exercise substantially no radial restraint.

11. A coupling as in claim 5 and wherein the internally toothed portion is in the form of a toothed sleeve and the externally toothed portion is in the form of a toothed disc.

12. A coupling as in claim 9 and wherein the means restraining said other end of said rod comprise a narrow circular flange at the end of said rod and a co-operating part within said other hollow end portion engaging said flange to provide radial restraint, and a threaded end piece on said rod and a co-operating threaded part within said other hollow end portion engaging said threaded piece to provide longitudinal restraint, the threads on said threaded piece and threaded part being proportioned to exercise substantially no radial restraint.

13. A coupling as in claim 9 and wherein the internally toothed portion is in the form of a toothed sleeve and the externally toothed portion is in the form of a toothed disc, the teeth on one of said portions being of straight-sided plan form, and on the other of elliptoid plan form.

References Cited in the file of this patent

UNITED STATES PATENTS

| | | |
|---|---|---|
| 1,639,644 | Baumann | Aug. 23, 1927 |
| 1,891,285 | Loewis | Dec. 20, 1932 |
| 2,525,695 | Lombard | Oct. 10, 1950 |
| 2,550,580 | McLeod et al. | Apr. 24, 1951 |

FOREIGN PATENTS

| | | |
|---|---|---|
| 759,920 | France | 1933 |
| 920,040 | France | Dec. 16, 1946 |